United States Patent
Shimizu et al.

(10) Patent No.: US 7,954,707 B2
(45) Date of Patent: Jun. 7, 2011

(54) FITTING ROOM TERMINAL, JOB SUPPORTING SYSTEM, AND INFORMATION ACQUIRING METHOD

(75) Inventors: Kenji Shimizu, Shizuoka (JP); Masanori Sanbe, Tokyo (JP); Kenya Hiramatsu, Shizuoka (JP); Takahide Kubota, Shizuoka (JP); Akio Hiruma, Shizuoka (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 28 days.

(21) Appl. No.: 12/466,608

(22) Filed: May 15, 2009

(65) Prior Publication Data
US 2009/0289108 A1 Nov. 26, 2009

(30) Foreign Application Priority Data
May 20, 2008 (JP) ................................. 2008-131896

(51) Int. Cl.
*G06K 5/00* (2006.01)
(52) U.S. Cl. ........................................................ 235/380
(58) Field of Classification Search .................. 235/380; 705/5
See application file for complete search history.

(56) References Cited

U.S. PATENT DOCUMENTS 5,056,019 A * 10/1991 Schultz et al. ............. 705/14.25
5,237,157 A * 8/1993 Kaplan ......................... 235/375
6,313,745 B1 * 11/2001 Suzuki ....................... 340/572.1
7,164,962 B2 * 1/2007 Petterson ..................... 700/132
2007/0158411 A1 * 7/2007 Krieg, Jr. ..................... 235/380

FOREIGN PATENT DOCUMENTS
JP 2005-189918 7/2005
JP 2005-309601 11/2005

* cited by examiner

*Primary Examiner* — Michael G Lee
*Assistant Examiner* — Tabitha Chedekel
(74) *Attorney, Agent, or Firm* — Turocy & Watson, LLP

(57) ABSTRACT

A display unit displays information in a fitting room. An operation input unit receives operation input of information in the fitting room. An RFID reader writer performs radio communication with an RFID tag, which is attached to a commodity and stores data of a commodity ID for identifying the commodity, and sets a radio communication range in the inside of the fitting room. A control unit that (i) acquires data of a commodity ID from an RFID tag attached to a commodity in the fitting room via the RFID reader writer, (ii) acquires, according to the acquisition of the data of the commodity ID, data of questionnaire information including a question and plural answers to the question from a questionnaire information file that stores the data of the questionnaire information, and (iii) causes the display unit to display the acquired questionnaire information, waits for selection of one or two or more answers, which are included in the questionnaire information displayed by the display unit, by operation input in the operation input unit, and causes a storage area to store the answers selected by the operation input in the operation input unit.

16 Claims, 13 Drawing Sheets

| CUSTOMER ID | CUSTOMER NAME | SEX | AGE |
|---|---|---|---|
| M1111 | ABCD | MALE | 19 |
| M2222 | EFGH | FEMALE | 48 |
| ⋮ | ⋮ | ⋮ | ⋮ |

| COMMODITY ID | COMMODITY NAME | UNIT PRICE |
|---|---|---|
| 1234 | ABC JACKET | ¥9,800 |
| 5678 | ABC SHIRT | ¥4,800 |
| ⋮ | ⋮ | ⋮ |

| CUSTOMER ID | POINT | POINT UPDATE DATE | UPDATE REASON |
|---|---|---|---|
| M1111 | 168 | 2008/4/1 11:45 | QUESTIONNAIRE |
| M2222 | 34 | 2008/4/1 13:21 | SETTLEMENT AMOUNT |
| ⋮ | ⋮ | ⋮ | ⋮ |

Fig. 9
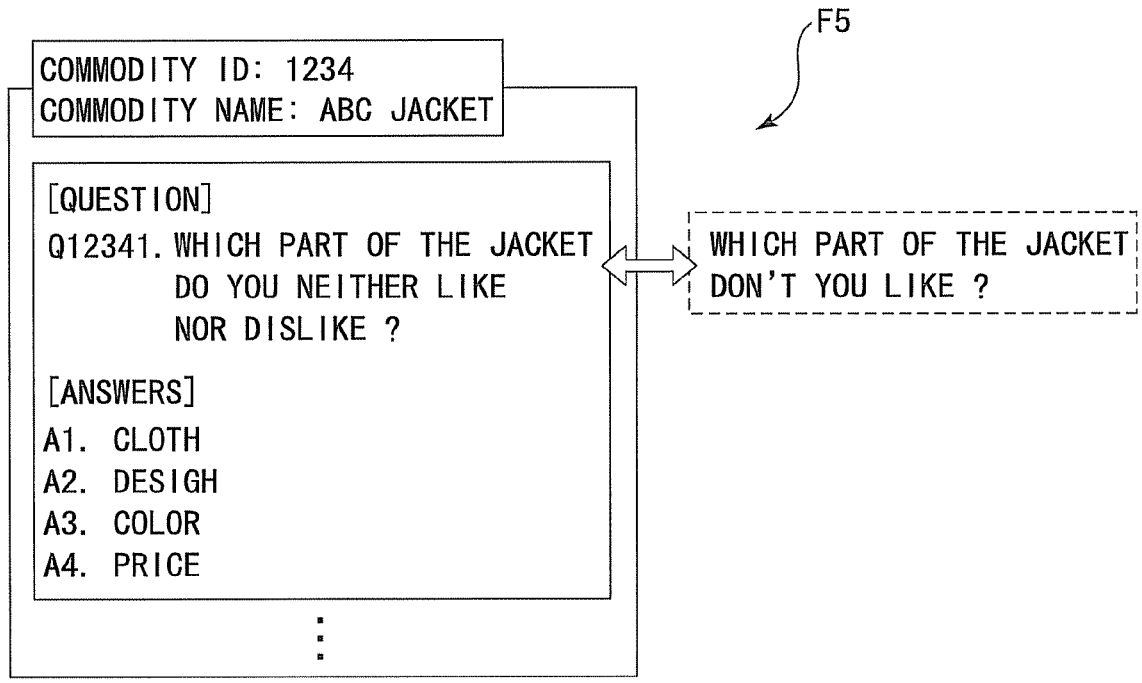
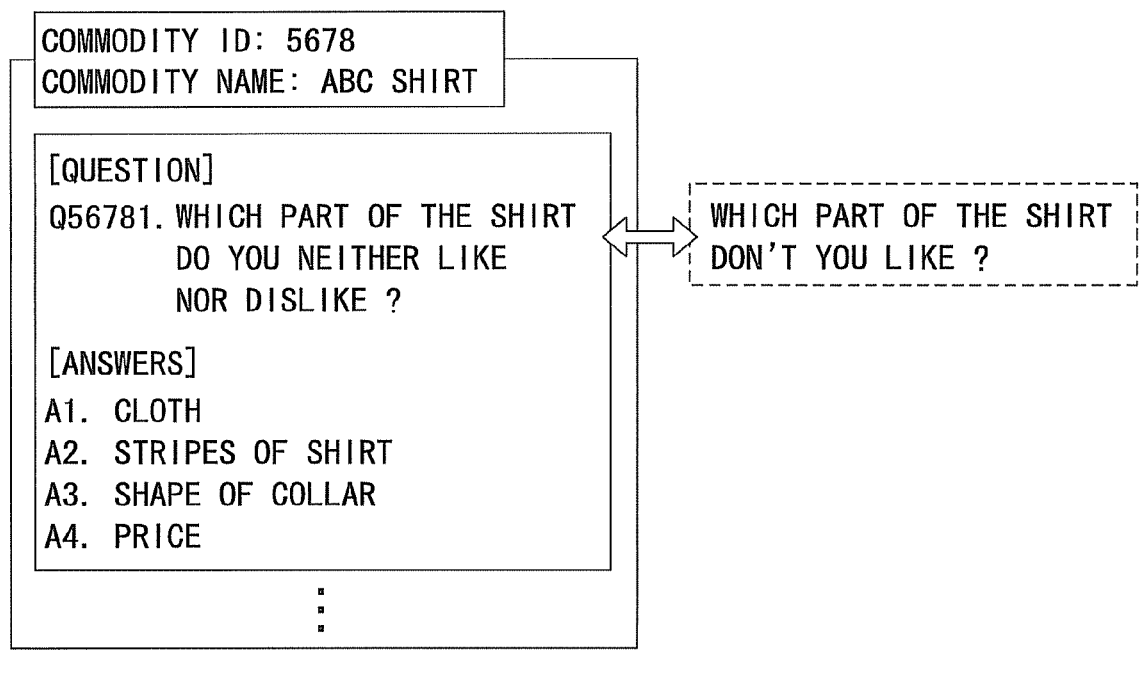

| ANSWER DATE AND TIME |
|---|
| 2008/4/1 11:45 |
| CUSTOMER ID |
| M1111 |

| QUESTION CODE | ANSWER CODE |
|---|---|
| QCMY1 | A1 |
| QCMY2 | A1 |
| ⋮ | ⋮ |

| ANSWER DATE AND TIME |
|---|
| 2008/4/1 13:21 |
| CUSTOMER ID |
| M2222 |

| QUESTION CODE | ANSWER CODE |
|---|---|
| ⋮ | ⋮ |

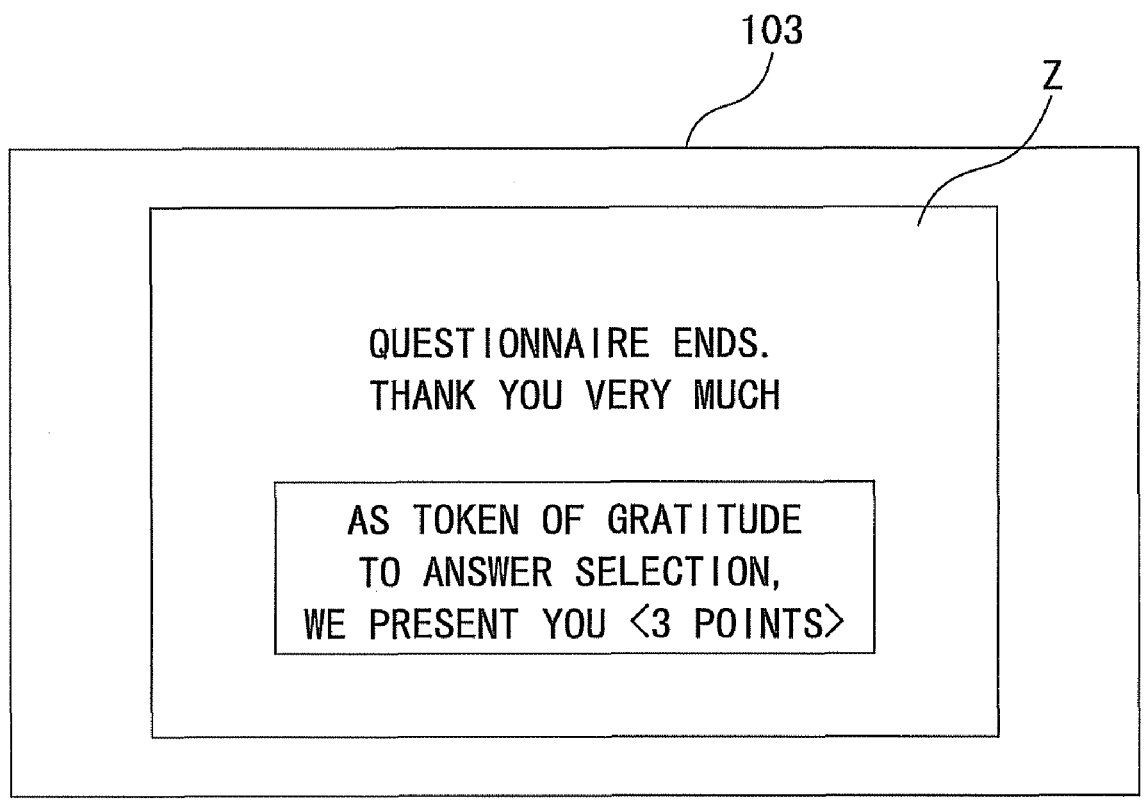

FITTING ROOM TERMINAL, JOB SUPPORTING SYSTEM, AND INFORMATION ACQUIRING METHOD

CROSS-REFERENCE TO RELATED APPLICATION

This application is based upon and claims the benefit of priority from Japanese Patent Application No. 2008-131896, filed on May 20, 2008, the entire contents of which are incorporated herein by reference.

TECHNICAL FIELD

The present invention relates to a fitting room terminal used by a customer in a fitting room, a job supporting system, and an information acquiring method.

BACKGROUND

Qualitative information concerning sales such as answers to questions "why do you purchase the commodity?" and "what are you dissatisfied with about the commodity?" is extremely important for an apparel seller. This is because the apparel seller can make use of the qualitative information concerning sales for the expansion of commodities sold in stores. For example, if the apparel seller can acquire answers to a question "what are you dissatisfied with" concerning a commodity that a customer tries on but does not purchase, instead of the commodity, the apparel seller can procure and sell a commodity that solves the dissatisfaction. Consequently, an increase in sales can be expected.

The apparel seller can acquire quantitative information concerning sales "which commodity is sold" and "how many commodities are sold" from a POS (Point Of Sales) system installed in a store. On the other hand, the apparel seller cannot acquire qualitative information concerning sales. In order to acquire the qualitative information concerning sales, the apparel seller may request customers visiting the store for shopping to answer questions printed on a questionnaire.

However, most of the customers mind public eyes and do not write honest opinions or reject answer the questions. Therefore, it is difficult for the apparel seller to acquire qualitative information concerning sales using the questionnaire.

JP-A-2005-189918 discloses a technique for providing a photographing service for photographing a customer, who tries an apparel article on, using a CCD camera in a fitting room to acquire information concerning what kinds of apparel articles the customer using the photographing service often tries on. JP-A-2005-309601 discloses a technique for reading, via an RFID reader writer in a fitting room, data such as commodity ID from an RFID tag attached to an apparel article brought into the fitting room by a customer. However, only quantitative information indicating which commodity and how many commodities a customer tries on is acquired even by the technique disclosed in JP-A-2005-189918 and the technique disclosed in JP-A-2005-309601.

SUMMARY

It is an object of the present invention to allow an apparel seller to acquire qualitative information concerning sales such as an answer to a question "what are you dissatisfied with about the commodity?".

According to an aspect of the present invention, there is provided a fitting room terminal including a display unit that displays information in a fitting room, an operation input unit that receives operation input of information in the fitting room, an RFID reader writer that performs radio communication with an RFID tag, which is attached to a commodity and stores data of a commodity ID for identifying the commodity, and sets a radio communication range in the inside of the fitting room, and a control unit that (i) acquires data of a commodity ID from an RFID tag attached to a commodity in the fitting room via the RFID reader writer, (ii) acquires, according to the acquisition of the data of the commodity ID, data of questionnaire information including a question and plural answers to the question from a questionnaire information file that stores the data of the questionnaire information, and (iii) causes the display unit to display the acquired questionnaire information, waits for selection of one or two or more answers, which are included in the questionnaire information displayed by the display unit, by operation input in the operation input unit, and causes a storage area to store the answers selected by the operation input in the operation input unit.

According to another aspect of the present invention, there is provided a job supporting system including a server including a questionnaire information file that stores data of questionnaire information including a question and plural answers to the question, and a fitting room terminal that communicates with the server. The fitting room terminal includes a display unit that displays information in a fitting room, an operation input unit that receives operation input of information in the fitting room, an RFID reader writer that performs radio communication with an RFID tag, which is attached to a commodity and stores data of a commodity ID for identifying the commodity, and sets a radio communication range in the inside of the fitting room, and a control unit that (i) acquires data of a commodity ID from an RFID tag attached to a commodity in the fitting room via the RFID reader writer, (ii) acquires, according to the acquisition of the data of the commodity Id, the data the questionnaire information from the questionnaire information file, and (iii) causes the display unit to display the acquired questionnaire information, waits for selection of one or two or more answers, which are included in the questionnaire information displayed by the display unit, by operation input in the operation input unit, and causes a storage area to store the answers selected by the operation input in the operation input unit.

According to still another aspect of the present invention, there is provided an information acquiring method including a control unit acquiring data of a commodity ID from an RFID tag attached to a commodity in a fitting room via an RFID reader writer, the RFID reader writer performing radio communication with an RFID tag, which is attached to a commodity and stores data of a commodity ID for identifying the commodity, and setting a radio communication range in the fitting room, the control unit acquiring, according to the acquisition of the data of the commodity ID, data of questionnaire information including a question and plural answers to the question from a questionnaire information file that stores the data of the questionnaire information, and the control unit causing a display unit to display the acquired questionnaire information, waiting for selection of one or two or more answers, which are included in the questionnaire information displayed by the display unit, by operation input in the operation input unit, and causing a storage area to store the answers selected by the operation input in the operation input unit, the display unit displaying information in the fitting room and the operation input unit receiving operation input of information in the fitting room.

DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein:

FIG. 5 is a schematic diagram of a data structure of a customer file;

FIG. 6 is a schematic diagram of a data structure of a commodity file;

FIG. 7 is a schematic diagram of a data structure of a point management file;

FIG. 9 a schematic diagram of a data structure of a questionnaire-information-by-commodity file;

FIG. 10 is a schematic diagram of a data structure of a questionnaire answer file;

FIG. 15 is a schematic diagram of a screen example of the LCD of the fitting room terminal that displays end notification information.

DETAILED DESCRIPTION

An embodiment of the present invention is explained with reference to FIGS. 1 to 15. This embodiment is an example of application of the present invention to a fitting room terminal 101 configuring a job supporting system 11 installed in an apparel store.

Figure 1:
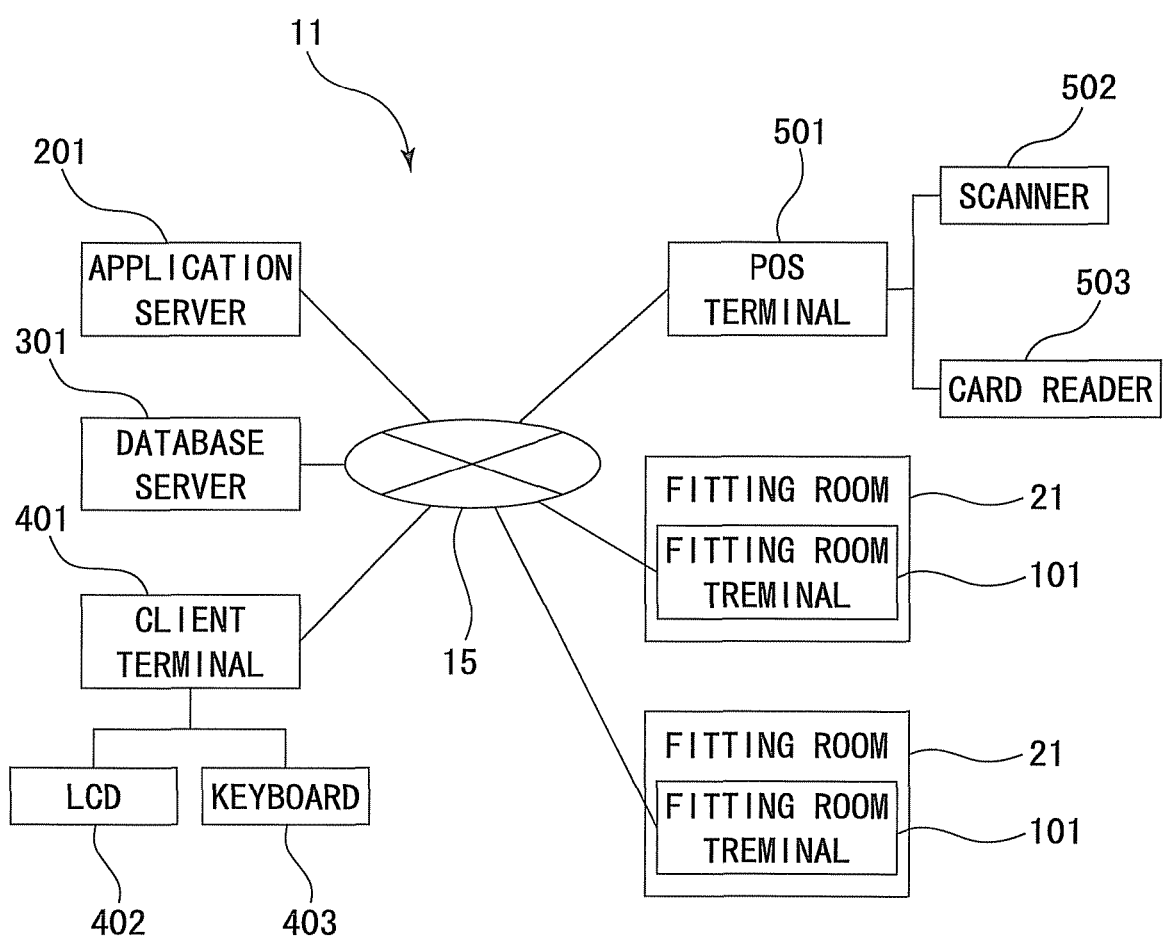
FIG. 1 is a system diagram of a job supporting system.

FIG. 1 is a system diagram of the job supporting system 11. A store that installs the job supporting system 11 is an apparel store. The store displays a large number of apparel articles 31 (see FIG. 2) as commodities. A register counter (not shown in the figure) near an exit of the store supports a POS terminal 501 serving as a commodity sales data processing apparatus. The POS terminal 501 executes commodity sales data processing.

Figure 2:
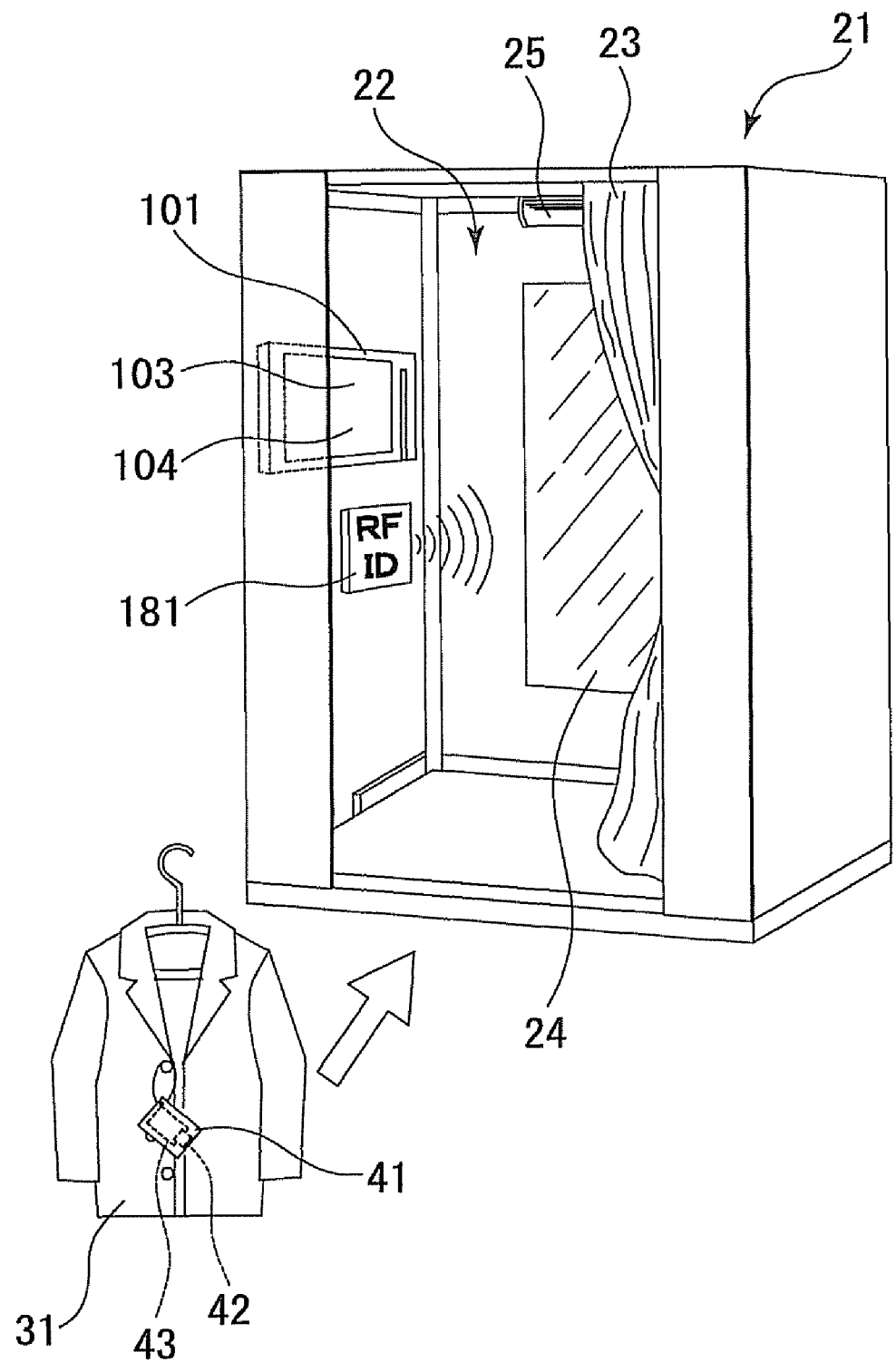
FIG. 2 is a perspective view of a fitting room including a fitting room terminal.
Figure 3:
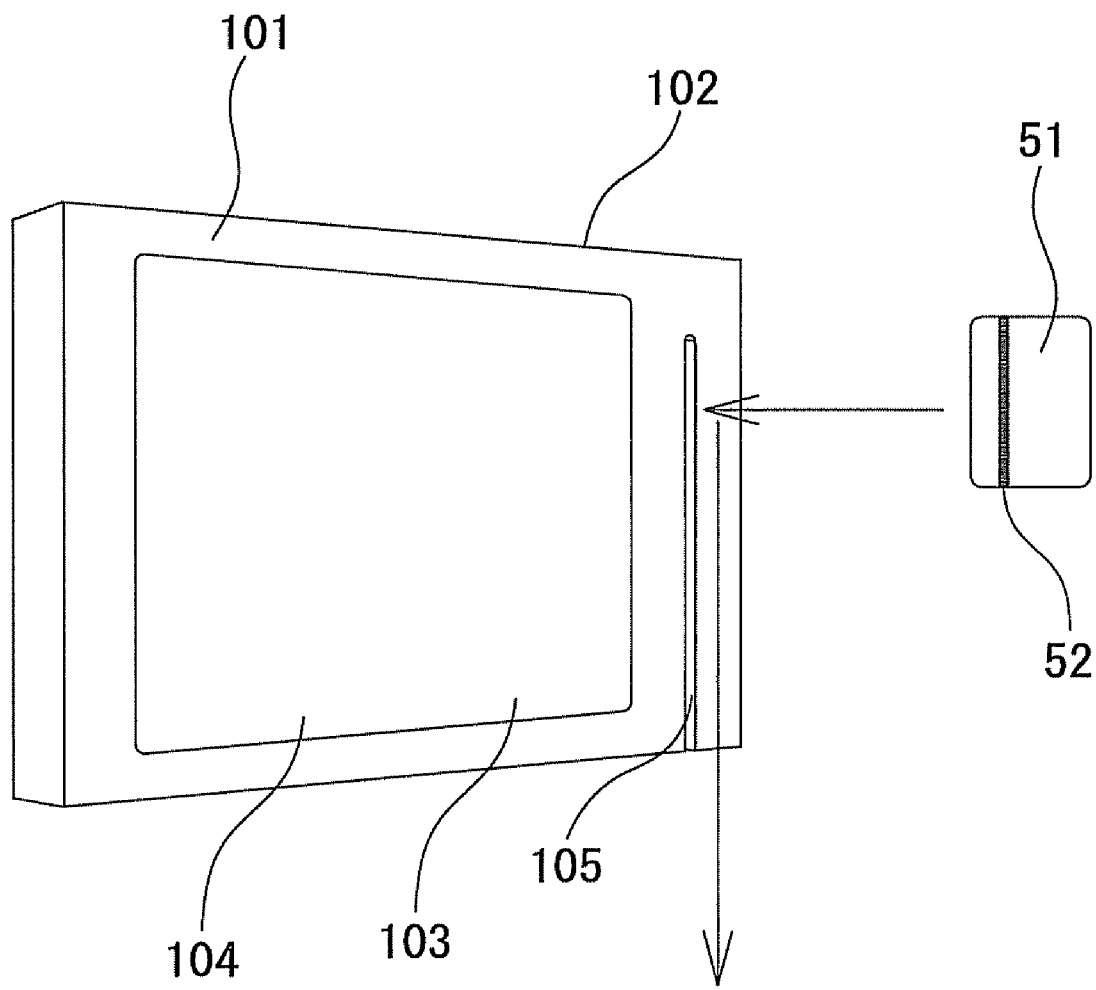
FIG. 3 is a perspective view of the fitting room terminal.

The POS terminal 501 includes a scanner 502 that scans and outputs data of a commodity ID peculiar to each commodity and a card reader 503 that reads and outputs data stored by a member card 51 (see FIG. 3). An RFID tag 41 (see FIG. 2) attached to the apparel article 31 (see FIG. 2), which is a commodity, shows a commodity ID in a form of a code symbol.

The POS terminal 501 is connected to an application server 201, a database server 301, and a client terminal 401 via a network line 15. All installation places of the application server 201, the database server 301, and the client terminal 401 are in a backyard and the like of the store.

The application server 201 is a general server computer. A display that displays information, a keyboard for inputting information, and a pointing device (all of which are not shown in the figure) are connected to a housing of the application server 201. The housing incorporates an HDD (not shown in the figure), which stores various files, as a storage device. An installation place of the application server 201 may be the outside of the store.

The database server 301 is a general server computer. A display that displays information, a keyboard for inputting information, and a pointing device (all of which are not shown in the figure) are connected to a housing of the database server 301. The housing incorporates an HDD (not shown in the figure), which stores various files, as a storage device. An installation place of the database server 301 may be the outside of the store.

The client terminal 401 is a notebook personal computer having an openable and closable housing. The client terminal 401 includes an LCD 402 that displays information, a keyboard 403 for inputting information, and a track pad (not shown in the figure) for moving a mouse pointer displayed by the LCD 402. Other components of the client terminal 401 are the same as those of a general notebook personal computer. Therefore, explanation of the client terminal 401 is omitted.

In the store as the apparel store, plural fitting rooms 21, each of which is used by a customer when the customer tries on the apparel article 31 (see FIG. 2), which is a commodity. The customer tries the apparel article 31 on in the fitting room 21 and considers purchase of the commodity. The fitting room 21 includes a fitting room terminal 101.

FIG. 2 is a perspective view of the fitting room 21 including the fitting room terminal 101. FIG. 3 is a perspective view of the fitting room terminal 101.

A shape of the fitting room 21 is a rectangular parallelepiped opened in a part of an upper surface and a part of a front surface. The opening in the front surface of the fitting room 21 is an entrance 22 through which a customer comes in and out. The fitting room 21 includes a cloth curtain 23 that opens and closes the entrance 22. In the fitting room 21 shown in FIG. 2, since the curtain 23 is open, the inside of the fitting room 21 is exposed via the entrance 22. A full-length mirror 24 that reflects the customer when the customer tries an apparel article on is located on a wall on a rear side in the fitting room 21. A light 25, which is a fluorescent lamp, is located in a position above the full-length mirror 24.

The fitting room terminal 101 is located on one sidewall in the fitting room 21. The fitting room terminal 101 displays information to the customer in the fitting room 21 and receives operation input of the customer.

The fitting room terminal 101 includes a thick flat housing 102. The housing 102 includes an LCD 103 serving as a display unit. A touch panel 104 serving as an operation input unit is arranged on a display surface of the LCD 103. The housing 102 incorporates a card reader 161 (see FIG. 4) serving as a reader along a card reading groove 105 on the right side of the LCD 103. The card reader 161 reads and acquires data of a customer ID stored by a magnetic stripe 52 of the member card 51 as a magnetic card that slides along the card reading groove 105. The customer ID is a code peculiar to each customer given to the customer by an apparel store when the customer becomes a member of the apparel store.

An RFID reader writer 181 for performing radio communication with the RFID tag 41 is located in a position below the fitting room terminal 101. The RFID reader writer 181 is connected to the fitting room terminal 101 located in a position above the RFID reader writer 181. The RFID reader writer 181 performs data communication with the fitting room terminal 101.

The RFID tag 41 is attached to the apparel article 31, which is a commodity, as a price tag. The RFID reader writer 181 performs radio communication with the RFID tag 41 attached to the apparel article 31 brought into the fitting room 21 by the customer. The RFID reader writer 181 sets the inside of the fitting room 21 as a communication range.

The RFID tag 41 is a passive tag that does not incorporate a battery. The RFID tag 41 incorporates an IC chip 42 and a coil-like tag antenna 43. The IC chip 42 stores data of a commodity ID for identifying a commodity.

The RFID reader writer 181 communicates with the RFID tag 41 according to an electromagnetic induction system that uses, for example, a 13.56 MHz frequency band. The RFID reader writer 181 communicates with the RFID tag 41 by using voltage induced by induced magnetic fluxes of an antenna coil (not shown in the figure) of the RFID reader writer 181 and the tag antenna 43. In a communication state, the RFID reader writer 181 acquires and outputs the data of the commodity ID stored by the IC chip 42. The data of the commodity ID output by the RFID reader writer 181 is input to a CPU 151 (see FIG. 4) of the fitting room terminal 101.

The fitting room terminal 101 incorporates a communication interface 162 (see FIG. 4) for performing data communication with the application server 201, the database server 301, and the like via the network line 15.

Figure 4:
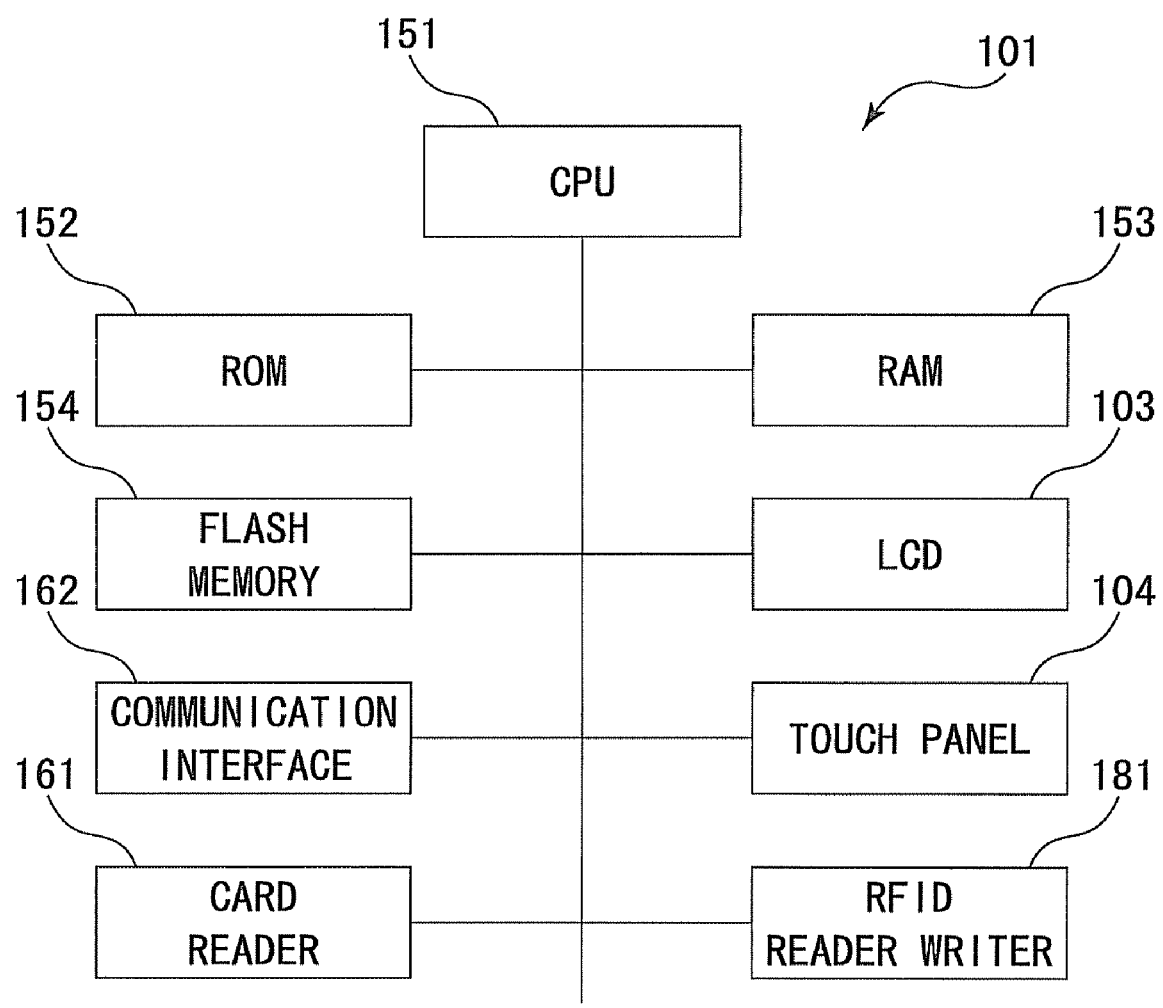
FIG. 4 is a block diagram of a hardware configuration of the fitting room terminal.

FIG. 4 is a block diagram of a hardware configuration of the fitting room terminal 101. The fitting room terminal 101 includes a CPU 151 serving as a control unit that executes various kinds of arithmetic processing and controls units of the fitting room terminal 101. The CPU 151 is connected to a ROM 152 that permanently stores stationary data such as computer programs, a RAM 153 that rewritably stores variable data and is used as a work area by the CPU 151, and a flash memory 154 as a nonvolatile memory that holds data content even if the fitting room terminal 101 is turned off. The flash memory 154 stores various computer programs and various files.

The CPU 151 is connected to the LCD 103, the touch panel 104, the card reader 161, the communication interface 162, and the RFID reader writer 181 via various input and output circuits (all of which are not shown in the figure), respectively. The CPU 151 controls the operation of the LCD 103, the touch panel 104, the card reader 161, the communication interface 162, and the RFID reader writer 181.

The CPU 151 of the fitting room terminal 101 accesses, during processing executed according to the description of the computer programs, files stored by the HDD (not shown in the figure) of the database server 301.

Various files stored by the HDD (not shown in the figure) of the database server 301 are explained with reference to FIGS. 5 to 10.

FIG. 5 is a schematic diagram of a data structure of a customer file F1. The customer file F1 stores "customer name", "sex", and "age" of a customer, who is a member of the apparel store, in association with "customer ID" for identifying the customer. Information stored in the customer file F1 is information provided to the apparel store by the customer when the customer becomes a member of the apparel store. The customer file F1 may store other kinds of information (e.g., an address and an email address) in association with "customer ID".

FIG. 6 is a schematic diagram of a data structure of a commodity file F2. The commodity file F2 stores "commodity name" and "unit price" of a commodity in association with "commodity ID" peculiar to each commodity. Commodity sales data processing executed by the POS terminal 501 is processing for acquiring, from the commodity file F2, data of "commodity name" and "unit price" corresponding to a commodity ID scanned by the scanner 502 and calculating a settlement amount.

In the commodity sales data processing, the POS terminal 501 calculates a point equivalent to cash that increases and decreases according to an increase and a decrease in the settlement amount. A point management file F3 (see FIG. 7) stores the point in association with a customer ID. When the commodity sales data processing is executed, the card reader 503 reads the member card 51 and acquires data of the customer ID.

FIG. 7 is a schematic diagram of a data structure of the point management file F3. The point management file F3 stores "point", "point update date" indicating date and time of update of data of the point, and "update reason" in association with "customer ID". When a point derived from a settlement amount is calculated, the point management file F3 stores [settlement amount] as "update reason". When a point derived from a questionnaire explained later is granted, the point management file F3 stores [questionnaire] as "update reason".

The files shown in FIGS. 5 to 7 are files mainly accessed by the POS terminal 501. Files mainly accessed by the fitting room terminal 101 are explained with reference to FIGS. 8 to 10.

Figure 8:
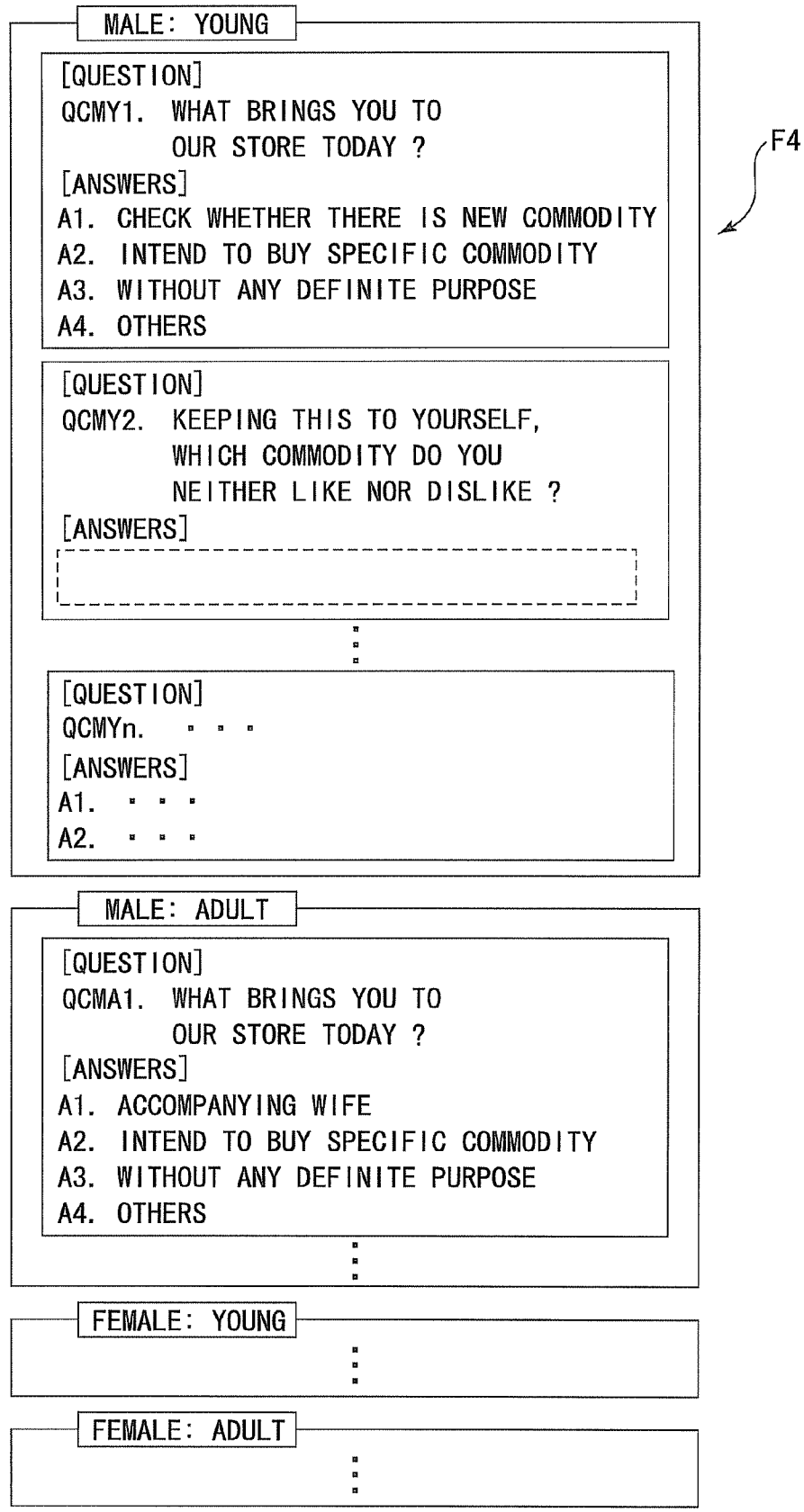
FIG. 8 is a schematic diagram of a data structure of a questionnaire-information-by-clientele file.

FIG. 8 is a schematic diagram of a data structure of a questionnaire-information-by-clientele file F4. The questionnaire-information-by-clientele file F4 and a questionnaire-information-by-commodity file F5 (see FIG. 9) explained later store data of questionnaire information that is a basis of information displayed by the LCD 103 of the fitting room terminal 101. The LCD 103 of the fitting room terminal 101 displays, to a customer in the fitting room 21, questionnaire information suitable for the customer and a commodity brought into the fitting room 21 by the customer.

The questionnaire-information-by-clientele file F4 stores questionnaire information for each of four clienteles ("male: young", "male: adult", "female: young", and "female: adult"). "Young" means the age of 25 years old or under. "Adult" means the age of 26 years old or over.

The questionnaire information includes [question] and plural [answers] to the question as basic components. For example, one kind of questionnaire information for "male: young" has four [answers], i.e., "check whether there is a new commodity", "intend to buy a specific commodity", "without any definite purpose", and "others", to [question] "what brings you to our store today?". A peculiar question code for identifying a question of questionnaire information "QCMY1" is attached to [question] "what brings you to our store today?". Answer codes "A1" to "A4" are attached to [answers]. Even if a question is the same, contents and expressions of answers are different if clienteles are different. For example, one kind of questionnaire information for "male: adult" has four [answers], i.e., "accompanying the wife", "intend to buy a specific commodity", "looking at newspaper ads", and "others", which are different from [answers] for "male: young", to [question] "what brings you to our store today?".

One kind of questionnaire information for "male: young" does not have content of [answer] to [question (QCMY2)] "keeping this to yourself, which commodity do you neither like nor dislike" (in FIG. 8, indicated by a blank space of a broken line frame). When the fitting room terminal 101 acquires data of questionnaire information, a commodity name of the apparel article 31 in the fitting room 21 corresponds to the content of [answer] indicated by the blank space of the broken line frame shown in FIG. 8.

The questionnaire-information-by-clientele F4 stores plural (n) kinds of questionnaire information for each clientele. Therefore, the LCD 103 of the fitting room terminal 101 displays questionnaire information suitable for a clientele of a customer in the fitting room 21.

FIG. 9 is a schematic diagram of a data structure of the questionnaire-information-by-commodity file F5. The questionnaire-information-by-commodity file F5 stores questionnaire information for each commodity ID. For convenience of illustration, in FIG. 9, a commodity name is also written together with a commodity ID.

The questionnaire information includes [question] and plural [answers] to the question as basic components. For example, one kind of questionnaire information for a commodity ID "1234" of an ABC jacket has four [answers], i.e., "cloth", "design", "color", and "price", to [question] "which part of the jacket do you neither like nor dislike?". When a customer brings the ABC jacket into the fitting room 21, the LCD 103 of the fitting room terminal 101 displays the questionnaire information. A peculiar question code for identifying a question of questionnaire information "Q12341" is attached to [question] "which part of the jacket do you neither like nor dislike?". The question code "Q12341" is derived from a commodity ID (1234) and a number (first) of a question.

For [question (Q12341)] "which part of the jacket do you neither like nor dislike?", a different question expression "which part of the jacket don't you like?" is prepared in advance. The former is selected and displayed when a clientele of a customer in the fitting room 21 is "young". The latter is selected and displayed when the clientele is "adult". Different question expressions are also prepared for questionnaire information of other commodity IDs.

When the LCD 103 of the fitting room terminal 101 displays questionnaire information, a customer can select [answer] to [question] including the questionnaire information displayed by the LCD 103 by operating the touch panel 104. A questionnaire answer file F6 (see FIG. 10) as a storage area sequentially stores [question] displayed by the LCD 103 and [answer] selected by the customer.

FIG. 10 is a schematic diagram of a data structure of the questionnaire answer file F6. The questionnaire answer file F6 stores "question code" and "answer code" in association with "answer date and time" and "customer ID". When a customer in the fitting room 21 selects [answer] to [question] of questionnaire information displayed by the LCD 103 of the fitting room terminal 101 by operating the touch panel 104, the questionnaire answer file F6 stores "question code" of [question] and "answer code" of [answer] in association with "customer ID" for identifying the customer. The questionnaire answer file F6 stores operation date and time of the touch panel 104 as "answer date and time".

A customer brings one or two or more apparel articles 31 displayed in the apparel store into the fitting room 21 to consider purchase of the apparel articles 31. Processing executed by the CPU 151 of the fitting room terminal 101 when the customer brings the apparel article 31 into the fitting room 21 is explained.

Figure 11:
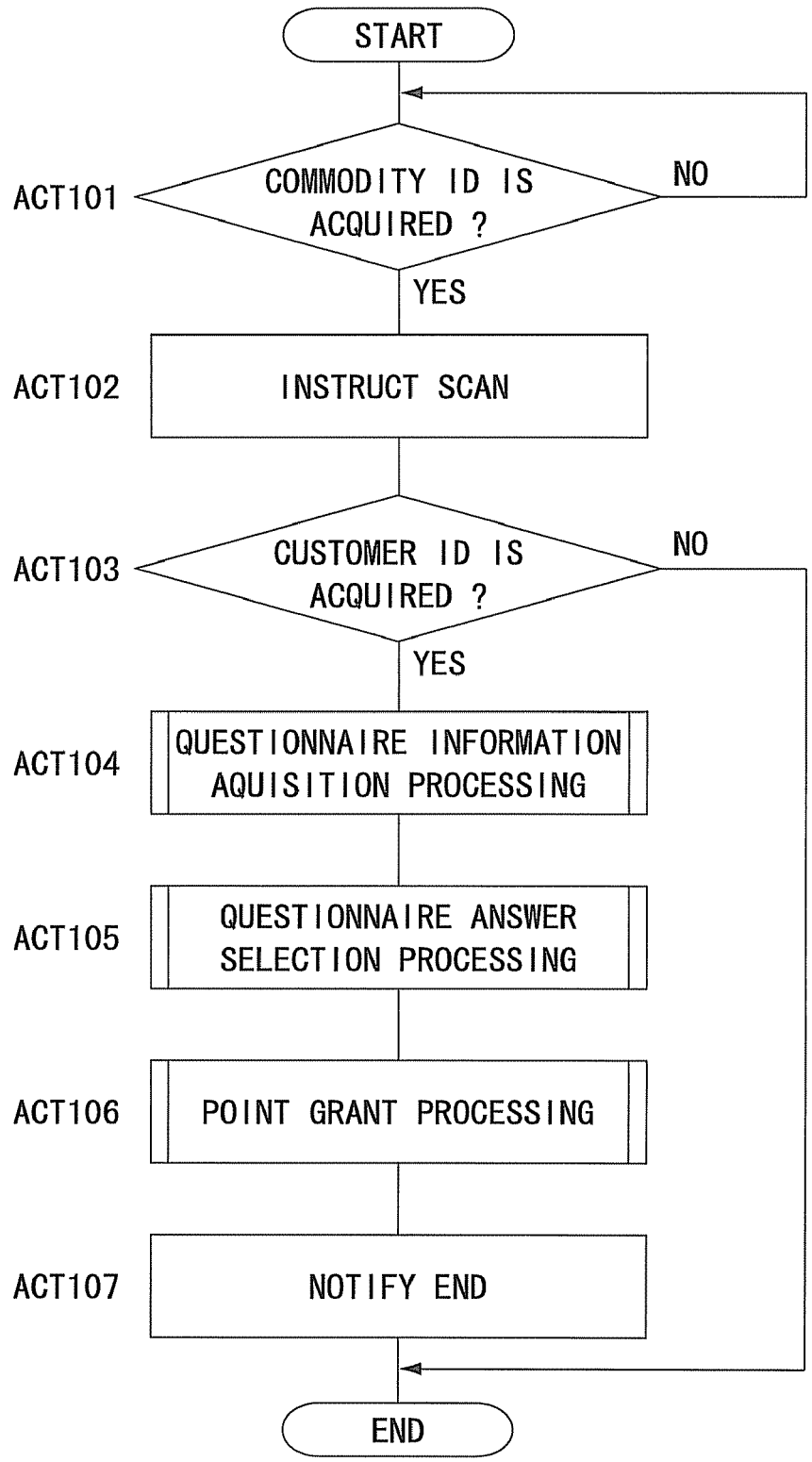
FIG. 11 is a flowchart of an example of processing executed by a CPU of a fitting room terminal.

FIG. 11 is a flowchart of an example of processing executed by the CPU 151 of the fitting room terminal 101. The CPU 151 of the fitting room terminal 101 waits for acquisition of data of a commodity ID (Act 101). When the customer brings the apparel article 31 into the fitting room 21, the REID reader writer 181 communicates with the RFID tag 41 attached to the apparel article 31 in the fitting room 21, acquires data of a commodity ID stored by the IC chip 42 incorporated in the RFID tag 41, and outputs the data of the commodity ID to the fitting room terminal 101. The CPU 151 of the fitting room terminal 101 acquires the data of the commodity ID. The RAM 153 stores the data of the commodity ID acquired by the CPU 151 of the fitting room terminal 101. When the customer brings two or more apparel articles 31 into the fitting room 21, the CPU 151 of the fitting room terminal 101 acquires data of commodity IDs from the RFID tags 41 attached to the apparel articles 31. The CPU 151 of the fitting room terminal 101 acquires plural commodity IDs.

When the data of the commodity ID is acquired (Yes in Act 101), the CPU 151 of the fitting room terminal 101 causes the LCD 103 to display a scan instruction S (see FIG. 12) (Act 102).

Figure 12:
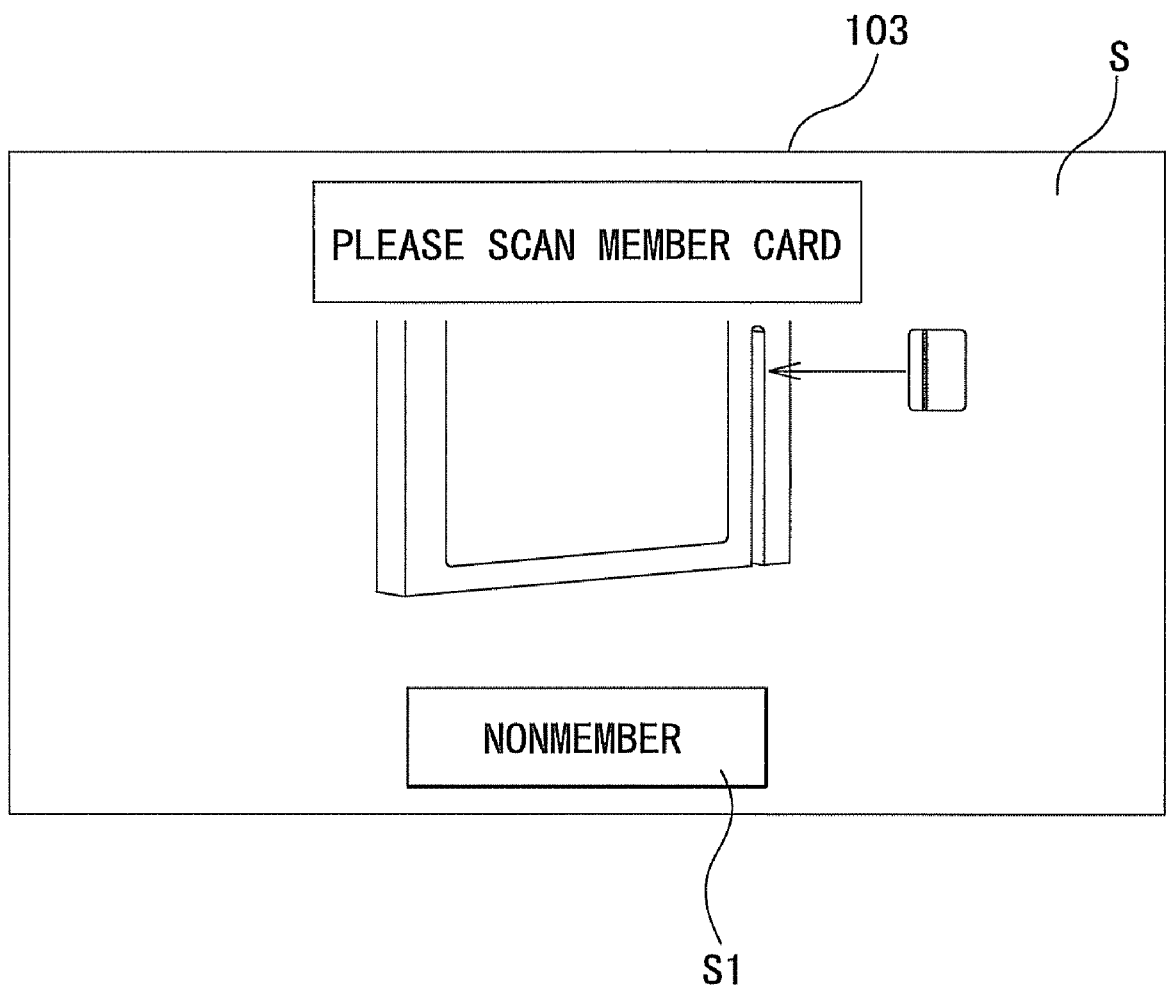
FIG. 12 is a schematic diagram of a screen example of an LCD of the fitting room terminal that displays a scan instruction.

FIG. 12 is a schematic diagram of a screen example of the LCD 103 of the fitting room terminal 101 that displays the scan instruction S. The scan instruction S instructs the customer in the fitting room 21 to slide the member card 51 along the card reading groove 105. The scan instruction S includes characters "please scan the member card", a pattern that supports scan operation, and a cancel button S1 for displaying characters "nonmember".

Referring back to FIG. 11, when the customer slides the member card 51 along the card reading groove 105 according to the scan instruction S (see FIG. 12) displayed by the LCD 103, the card reader 161 reads data of a customer ID stored by the magnetic stripe 52 of the member card 51 and outputs the data of the customer ID to the CPU 151. The CPU 151 of the fitting room terminal 101 acquires the data of the customer ID and causes the RAM 153 to store the data of the customer ID (Yes in Act 103).

When the customer touches the cancel button S1 (see FIG. 12) for cancellation of the scan instruction S through the touch panel 104, the CPU 151 of the fitting room terminal 101 finishes the processing without acquiring the data of the customer ID (No in Act 103). When the processing is finished, the LCD 103 displays information for recommending the customer to become a member (not shown in the figure).

When the data of the customer ID is acquired (Yes in Act 103), the CPU 151 of the fitting room terminal 101 executes processing for acquiring questionnaire information to be displayed on the LCD 103 (questionnaire information acquisition processing) (Act 104). The questionnaire information acquisition processing is explained with reference to FIG. 13.

Figure 13:
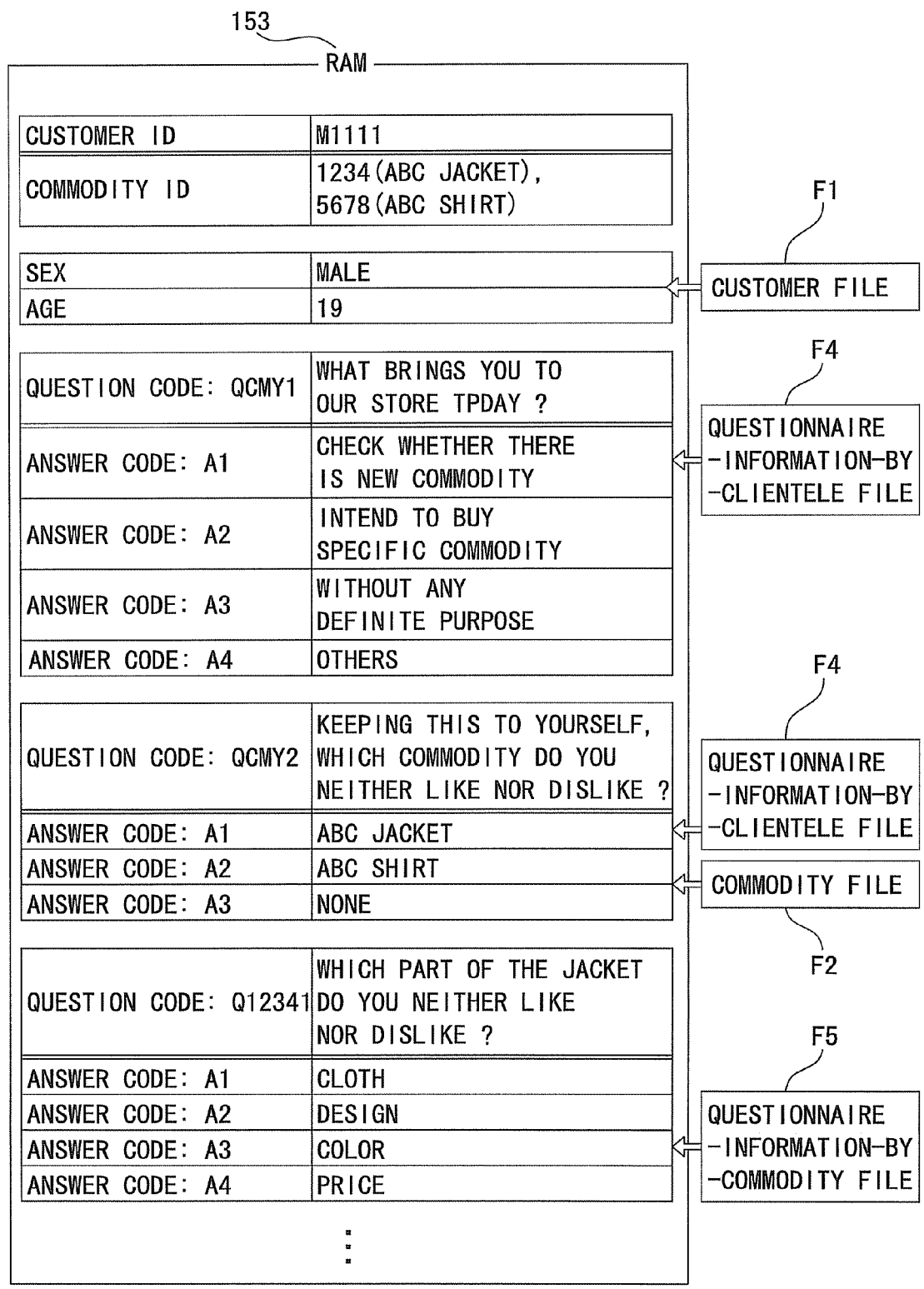
FIG. 13 is a schematic diagram of processing contents of questionnaire information acquisition processing.

FIG. 13 is a schematic diagram of processing content of the questionnaire information acquisition processing. As shown in a first table from the top in the RAM 153 shown in FIG. 13, the RAM 153 stores a customer ID (M1111) and commodity IDs (1234 and 5678) that are already acquired.

As shown in a second table from the top of the RAM 153 shown in FIG. 13, first, the CPU 151 of the fitting room terminal 101 accesses the customer file F1 (see FIG. 5). The CPU 151 of the fitting room terminal 101 acquires data of "sex" and "age" corresponding to the customer ID stored by the RAM 153 from the customer file F1 and causes the RAM 153 to store the data. In this way, the CPU 151 of the fitting room terminal 101 acquires "sex" and "age" of the customer in the fitting room 21. An example in which "sex" is male and "age" is 19 is explained below.

As shown in a third table from the top of the RAM 153 shown in FIG. 13, the CPU 151 of the fitting room terminal 101 accesses the questionnaire-information-by-clientele file F4 (see FIG. 8). Since "sex" is male and "age" is 19, the CPU 151 of the fitting room terminal 101 acquires the questionnaire information ([question] and [answer]) concerning "male: young" from the questionnaire-information-by-clientele file F4 and causes the RAM 153 to store the data. The RAM 153 does not store data of [answer] to [question] (keeping this to yourself, which commodity do you neither like nor dislike?) identified by the question code "QCMY2").

As shown in a fourth table from the top of the RAM 153 shown in FIG. 13, the CPU 151 of the fitting room terminal 101 accesses the commodity file F2 (see FIG. 6). The CPU 151 of the fitting room terminal 101 acquires data of "commodity name" corresponding to the commodity ID stored by the RAM 153 from the commodity file F2, applies the acquired "commodity name" as [answer] to [question] (keeping this to yourself, which commodity do you neither like nor dislike?) identified by the question code "QCMY2", and causes the RAM 153 to store the acquired "commodity name". The CPU 151 of the fitting room terminal 101 causes the RAM 153 to store the acquired "commodity name" in association with an answer code. The CPU 151 of the fitting room terminal 101 also causes the RAM 153 to store an answer "none" in association with an answer code.

As shown in a fifth table from the top of the RAM 153 shown in FIG. 13, the CPU 151 of the fitting room terminal 101 accesses the questionnaire-information-by-commodity file F5 (see FIG. 9). The CPU 151 of the fitting room terminal 101 acquires data of questionnaire information "[question] and [answer]" corresponding to the commodity ID stored by the RAM 153 from the questionnaire-information-by-commodity file F5 and causes the RAM 153 to store the data.

Referring back to FIG. 11, the CPU 151 of the fitting room terminal 101 executes questionnaire answer selection processing (Act 105). In the questionnaire answer selection processing, the CPU 151 of the fitting room terminal 101 causes the LCD 103 to display the questionnaire information acquired in the questionnaire information acquisition processing in Act 104 and receives answer selection by the customer through touch operation on the touch panel 104. The questionnaire answer selection processing is explained with reference to FIG. 14.

Figure 14:
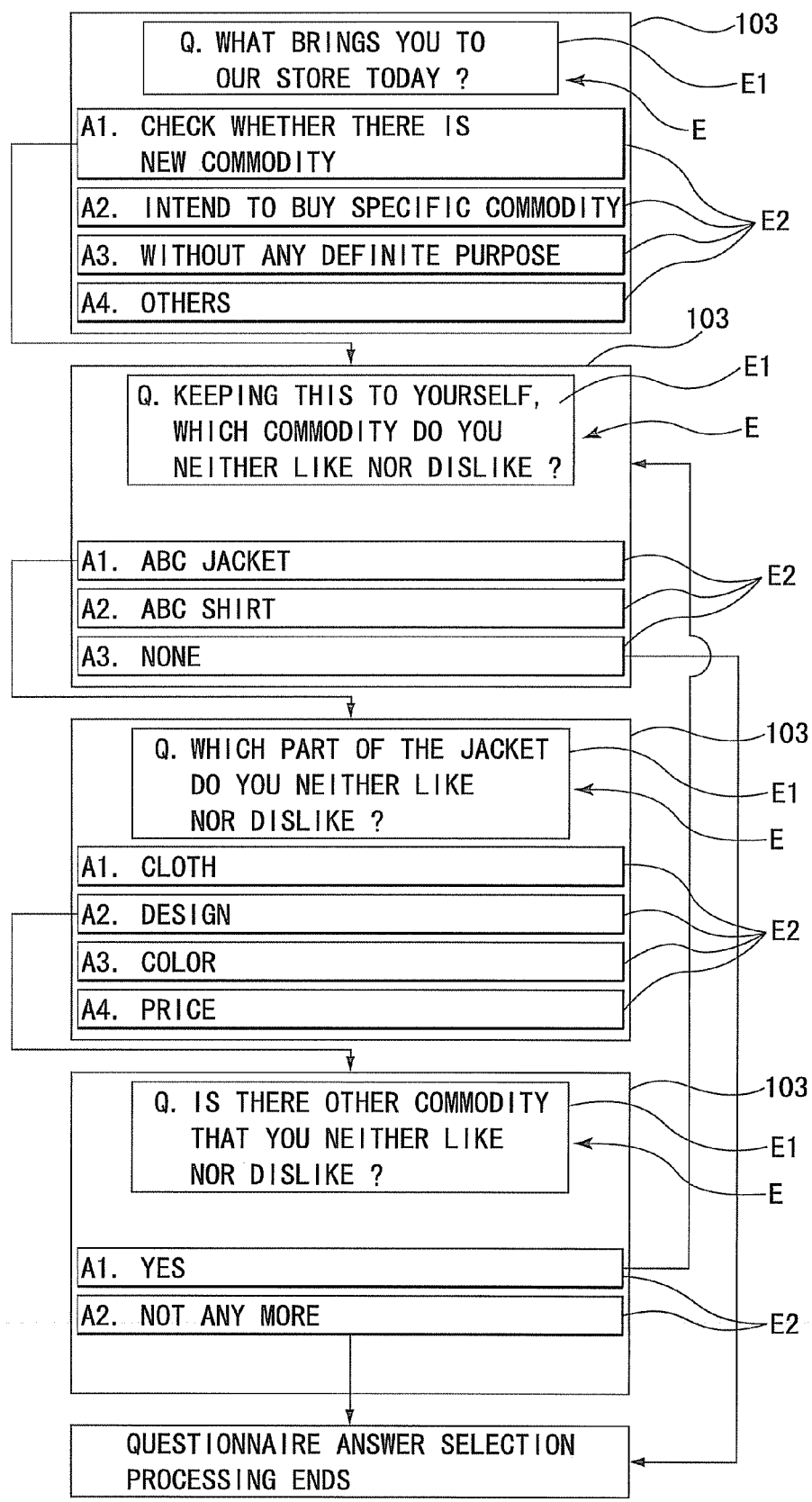
FIG. 14 is a schematic diagram of a screen transition example of the LCD of the fitting room terminal in questionnaire answer selection processing.

FIG. 14 is a schematic diagram of a screen transition example of the LCD 103 of the fitting room terminal 101 in the questionnaire answer selection processing. In the questionnaire answer selection processing, the CPU 151 of the fitting room terminal 101 causes the LCD 103 to sequentially display the questionnaire information (see FIG. 13), the data of which is store by the RAM 153, as questionnaire information E. Each piece of the questionnaire information E includes a question E1 and plural answers E2.

First, the CPU 151 causes the LCD 103 to display the questionnaire information (see the third table from the top of the RAM 153 shown in FIG. 13), the data of which is stored by the RAM 153, as first questionnaire information E for the customer in the fitting room 21.

As shown in a first row from the top of FIG. 14, the LCD 103 displays, as the questionnaire information E, the question E1 "Q. What brings you to our store today?" and the plural answers E2 "A1. Check whether there is a new commodity", "A2. Intend to buy a specific commodity", and the like.

When the CPU 151 determines that the answer E2 "A. Check whether there is a new commodity" is selected through the touch operation on the touch panel 104, the CPU 151 causes the RAM 153 to store a question code of the question E1 and an answer code of the answer E2 "A1. Check whether there is a new commodity" in association with each other.

Subsequently, the CPU 151 causes the LCD 103 to display the questionnaire information (see the fourth table from the top of the RAM 153 shown in FIG. 13), the data of which is stored by the RAM 153, as the questionnaire information E concerning the apparel article 31 in the fitting room 21.

As shown in a second row from the top of FIG. 14, the LCD 103 displays the question E1 "Q. Keeping this to yourself, which commodity do you neither like nor dislike?" and the answers E2 "A1. ABC jacket", "A2. ABC shirt", and "A3. None" as the questionnaire information E.

When the CPU 151 determines that the answer E2 "A3. None" is selected through the touch operation on the touch panel 104, the CPU 151 causes the RAM 153 to store a question code of the question E1 and an answer code of the answer E2 "A3. None" in association with each other. The CPU 151 erases the questionnaire information E from the LCD 103 and finishes the questionnaire answer selection processing.

However, when the CPU 151 determines that, for example, the answer E2 "A1. ABC jacket" is selected through the touch operation on the touch panel 104, the CPU 151 causes the RAM 153 to store the question code of the question E1 and an answer code of the answer E2 "A1. ABC jacket" in association with each other. The CPU 151 causes the LCD 103 to display the questionnaire information (see the fifth table from the top of the RAM 153 shown in FIG. 13), the data of which is stored by the RAM 153, as the questionnaire information E concerning the ABC jacket.

As shown in a third row from the top of FIG. 14, the LCD 103 displays the question E1 "Q. Which part of the jacket do you neither like nor dislike?" and the answers E2 "A1. Cloth", "A2. Design", "A3. Color", and "A4. Price" as the questionnaire information E.

When the CPU 151 determines that the answer E2 "A2. Design" is selected through the touch operation on the touch panel 104, The CPU 151 causes the RAM 153 to store a question code of the question E1 and an answer code of the answer E2 "A2. Design" in association with each other. The CPU 151 causes the LCD 103 to display the questionnaire information E for finishing the answer selection by the customer.

As shown in a fourth row from the top of FIG. 14, the LCD 103 displays the question E1 "Q. Is there other commodity that you neither like nor dislike?" and the answers E2 "A1. Yes" and "A2. Not any more" as the questionnaire information E.

When the CPU 151 determines that the answer E2 "A1. Yes" is selected through the touch operation, the CPU 151 resets the screen display of the LCD 103 to the questionnaire information E concerning the apparel article 31 in the fitting room 21.

When the CPU 151 determines that the answer E2 "A2. Not any more" is selected through the touch operation, the CPU 151 erases the questionnaire information E from the LCD 103 and finishes the questionnaire answer selection processing.

In finishing the questionnaire answer selection processing, the CPU 151 of the fitting room terminal 101 accesses the questionnaire answer file F6 (see FIG. 10). The CPU 151 causes the questionnaire answer file F6 to store the question code, which the CPU 151 causes the RAM 153 to store during the questionnaire answer selection processing, as "question code". The CPU 151 causes the questionnaire answer file F6 to store the answer code, which the CPU 151 causes the RAM 153 to store during the questionnaire answer selection processing, as "answer code". The CPU 151 causes the questionnaire answer file F6 to store the customer ID (see the first table from the top of the RAM 153 shown in FIG. 13), which the CPU 151 acquires from the member card 51 and causes the RAM 153 to store, as "customer ID". The CPU 151 causes the questionnaire answer file F6 to store date and time of data storage in the questionnaire answer file F6 as "answer date and time". "Answer date and time" may be date and time when the customer actually operates the fitting room terminal 101.

After the questionnaire answer selection processing, the CPU 151 of the fitting room terminal 101 executes point grant processing (Act 106).

In the point grant processing in Act 106, the CPU 151 of the fitting room terminal 101 accesses the point management file F3 (see FIG. 7). The CPU 151 of the fitting room terminal 101 adds a set point (e.g., 3 points) to "point" corresponding to "customer ID", which the CPU 151 causes the RAM 153 to store in Act 103, and updates "point". The CPU 151 causes the point management file F3 to store update date and time of the point as "point update date". Further, the CPU 151 causes the point management file F3 to store [questionnaire] as "update reason" corresponding to the update.

When the point grant processing (Act 106) is finished, the CPU 151 of the fitting room terminal 101 causes the LCD 103 to display end notification information Z (see FIG. 15) for notifying the customer of the end of the processing in the fitting room terminal 101 (Act 107) and finishes the processing.

FIG. 15 is a schematic diagram of a screen example of the LCD 103 of the fitting room terminal 101 that displays the end notification information Z. The end notification information Z includes characters "The questionnaire ends. Thank you very much". When the customer looks at the end notification information Z, the customer can recognize that the display of the questionnaire information E (see FIG. 14) on the LCD 103 of the fitting room terminal 101 is finished and the selection operation for the answer E2 via the touch panel 104 is finished.

Further, the end notification information Z includes characters "As a token of gratitude to answer selection, we present you <3 points>". According to the end notification information Z, the customer can recognize the point grant through the answer selection in the fitting room terminal 101. For the customer, the point grant is an incentive to an answer to the questionnaire. Therefore, it can be expected that "the customer willingly answers a questionnaire in the fitting room 21 when the customer visits the store for shopping next time".

In the point grant with [questionnaire] set as "update reason", a daily upper limit is set for the number of points to be granted. For example, when 3 points are granted every time, an upper limit of pints per one day is set to 9 points. By setting the daily upper limit to the number of points to be granted, even if a customer operates the fitting room terminal 101 in the fitting room 21 and answers a questionnaire many times in one day, the customer can only receive 9 points (3 points ☐ three times) at the maximum. When the point management file F3 stores [questionnaire] in "update reason" three times in one day for a certain customer (customer ID), it is regarded that the upper limit is reached. Therefore, the point management file F3 also stores the number of times of storage in one day of [questionnaire] in "update reason" and information indicating that the upper limit is reached in association with the customer ID. In the point grant processing, when the CPU 151 of the fitting room terminal 101 accesses the point management file F3, if the CPU 151 determines that the point management file F3 stores the information indicating that the upper limit is reached, the CPU 151 of the fitting room terminal 101 does not grant points according to an answer to the questionnaire. The customer is not refused to answer the questionnaire many times.

A store clerk can check content of the data stored by the questionnaire answer file F6 by causing the LCD 402 of the client terminal 401 to display the content of the data. A CPU (not shown in the figure) of the client terminal 401 accesses the questionnaire answer file F6 via the network line 15, acquires the data stored by the questionnaire answer file F6, and provides the LCD 402 with the content of the acquired data.

The CPU of the client terminal 401 acquires, concerning the data stored by the questionnaire answer file F6, only data in a specific period (from X day of X month to Y day of Y month) or acquires only data related to a specific commodity (commodity ID). Then, the LCD 402 of the client terminal 401 provides information display with limited items.

As explained above, according to this embodiment, when the customer brings the apparel article 31 into the fitting room 21, the CPU 151 of the fitting room terminal 101 acquires, with the RFID reader writer 181, the data of the commodity ID from the RFID tag 41 attached to the apparel article 31 in the fitting room 21. The LCD 103 displays the questionnaire information E (the question E1 and the answers E2). The customer selects the answer E2 to the question E1 by operating the touch panel 104. The questionnaire answer file F6 stores "question code" of the question E1 and "answer code" of the answer E2 in association with each other. The store clerk can acquire qualitative information concerning sales such as an answer to a question "what are you dissatisfied with about the commodity?" by referring to the questionnaire answer file F6.

The customer can operate the touch panel 104 and select an answer without minding public eyes in the fitting room 21. Therefore, an answer, selection of which is determined by the CPU 151, reflects an honest opinion of the customer.

The store clerk can check the data content stored by the questionnaire answer file F6 by causing the LCD 402 or the like of the client terminal 401 to display the data content. Therefore, the store clerk can make use of the data content stored by the questionnaire answer file F6 for expansion of commodities sold in the store in future.

The questionnaire information E displayed by the LCD 103 of the fitting room terminal 101 relates to the apparel article 31 brought into the fitting room 21 by the customer and corresponds to a clientele to which the customer in the fitting room 21 belongs. Therefore, the store clerk can acquire appropriate information.

The CPU 151 of the fitting room terminal 101 does not have to directly access the various files included in the database server 301.

Another example of the questionnaire information acquisition processing (Act 104 in FIG. 11; see FIG. 13) is explained. The CPU 151 of the fitting room terminal 101 instructs the application server 201 to acquire questionnaire information. A CPU (not shown in the figure) of the application server 201 acquires necessary data from the questionnaire-information-by-clientele file F4 and the questionnaire-information-by-commodity file F5 included in the database server 301. The CPU of the application server 201 transmits the data acquired from the questionnaire-information-by-clientele file F4 and the questionnaire-information-by-commodity file F5 to the fitting room terminal 101. The CPU 151 of the fitting room terminal 101 receives, via the communication interface 162, the data transmitted by the application server 201 and causes the RAM 153 to store the data.

Another example of the questionnaire answer selection processing (Act 105 in FIG. 11; see FIG. 14) is explained. In finishing the questionnaire answer selection processing, the CPU 151 of the fitting room terminal 101 transmits the data of the question code and the answer code, which are stored by the RAM 153 during the questionnaire answer selection processing, to the application server 201 in association with each other. The CPU of the application server 201 causes the questionnaire answer file F6 (see FIG. 10) of the database server 301 to store the data transmitted by the fitting room terminal 101.

Another example of the point grant processing (Act 106 in FIG. 11) is explained. The CPU 151 of the fitting room terminal 101 instructs the application server 201 to access the point management file F3 and grant points.

Obviously, numerous modifications and variations of the present invention are possible in light of the above teachings. It is therefore to be understood that within the scope of the appended claims, the invention may be practiced otherwise than as specifically described herein.

What is claimed is:

1. A fitting room terminal comprising:
a display unit that displays information in a fitting room;
an operation input unit that receives operation input of information in the fitting room;
an RFID reader writer that performs radio communication with an RFID tag, which is attached to a commodity and stores data of a commodity ID for identifying the commodity, and sets a radio communication range in an inside of the fitting room;
a control unit that (i) acquires data of a commodity ID from an RFID tag attached to a commodity in the fitting room via the RFID reader writer, (ii) acquires data of questionnaire information including a question regarding the acquired data of the commodity ID and plural answers to the question from a questionnaire information file that stores the data of the questionnaire information, and (iii) causes the display unit to display the acquired questionnaire information, waits for selection of one or two or more answers, which are included in the questionnaire information displayed by the display unit, by operation input in the operation input unit, and causes a storage area to store the answers selected by the operation input in the operation input unit; and
a reader that reads data from a medium, which stores data of a customer ID for identifying a customer, and outputs the data, wherein
the control unit adds, by storing in the storage area of the answer selected by the operation input in the operation input units, a set point to points stored by a point management file that stores customer IDs and points in association with each other, the points being stored by the point management file in association with a customer ID same as the customer ID output by the reader.

2. The terminal according to claim 1, wherein
the questionnaire information file stores data of the questionnaire information concerning the commodity identified by the commodity ID in association with the commodity ID, and
the control unit acquires, in acquiring the data of the questionnaire information from the questionnaire information file according to the acquisition of the data of the commodity ID, data of the questionnaire information corresponding to the acquired commodity ID from the questionnaire information file.

3. The terminal according to claim 1, wherein
the questionnaire information file stores data of the questionnaire information concerning a type of the customer in association with the type, and
the control unit acquires, in acquiring the data of the questionnaire information from the questionnaire information file according to the acquisition of the data of the commodity ID, data of the questionnaire information corresponding to the type of the customer identified by the customer ID, which is output by the reader, from the questionnaire information file.

4. The terminal according to claim 2, wherein
the questionnaire information file stores data of the questionnaire information concerning a type of the customer in association with the type, and
the control unit acquires, in acquiring the data of the questionnaire information from the questionnaire information file according to the acquisition of the data of the commodity ID, data of the questionnaire information corresponding to the type of the customer identified by the customer ID, which is output by the reader, from the questionnaire information file.

5. The terminal according to claim 3, wherein
the medium is a card that stores data, and
the reader is a card reader that reads and outputs the data stored by the card.

6. The terminal according to claim 4, wherein
the medium is a card that stores data, and
the reader is a card reader that reads and outputs the data stored by the card.

7. A job supporting system comprising:
a server including a questionnaire information file that stores data of questionnaire information including a question and plural answers to the question; and
a fitting room terminal that communicates with the server, wherein
the fitting room terminal includes:
a display unit that displays information in a fitting room;
an operation input unit that receives operation input of information in the fitting room;
an RFID reader writer that performs radio communication with an RFID tag, which is attached to a commodity and stores data of a commodity ID for identifying the commodity, and sets a radio communication range in an inside of the fitting room;
a control unit that (i) acquires data of a commodity ID from an RFID tag attached to a commodity in the fitting room via the RFID reader writer, (ii) acquires the data of the questionnaire information, associated with the acquired data of the commodity ID, from the questionnaire information file, and (iii) causes the display unit to display the acquired questionnaire information, waits for selection of one or two or more answers, which are included in the questionnaire information displayed by the display unit, by operation input in the operation input unit, and causes a storage area to store the answers selected by the operation input in the operation input unit; and
a reader that reads data from a medium, which stores data of a customer ID for identifying a customer, and outputs the data, wherein
the control unit adds, by storing in the storage area of the answer selected by the operation input in the operation input units, a set point to points stored by a point management file that stores customer IDs and points in association with each other, the points being stored by the point management file in association with a customer ID same as the customer ID output by the reader.

8. The system according to claim 7, wherein
the questionnaire information file stores data of the questionnaire information concerning the commodity identified by the commodity ID in association with the commodity ID, and
the control unit acquires, in acquiring the data of the questionnaire information from the questionnaire information file according to the acquisition of the data of the commodity ID, data of the questionnaire information corresponding to the acquired commodity ID from the questionnaire information file.

9. The system according to claim 7, wherein
the questionnaire information file stores data of the questionnaire information concerning a type of the customer in association with the type, and
the control unit acquires, in acquiring the data of the questionnaire information from the questionnaire information file according to the acquisition of the data of the commodity ID, data of the questionnaire information corresponding to the type of the customer identified by the customer ID, which is output by the reader, from the questionnaire information file.

10. The system according to claim 8, wherein
the questionnaire information file stores data of the questionnaire information concerning a type of the customer in association with the type, and
the control unit acquires, in acquiring the data of the questionnaire information from the questionnaire information file according to the acquisition of the data of the commodity ID, data of the questionnaire information corresponding to the type of the customer identified by the customer ID, which is output by the reader, from the questionnaire information file.

11. The system according to claim 9, wherein
the medium is a card that stores data, and
the reader is a card reader that reads and outputs the data stored by the card.

12. The system according to claim 10, wherein
the medium is a card that stores data, and
the reader is a card reader that reads and outputs the data stored by the card.

13. An information acquiring method comprising:
a control unit acquiring data of a commodity ID from an RFID tag attached to a commodity in a fitting room via an RFID reader writer, the RFID reader writer performing radio communication with an RFID tag, which is attached to a commodity and stores data of a commodity ID for identifying the commodity, and setting a radio communication range in an inside of the fitting room;
the control unit acquiring data of questionnaire information including a question regarding the acquired data of the commodity ID and plural answers to the question from a questionnaire information file that stores the data of the questionnaire information;
the control unit causing a display unit to display the acquired questionnaire information, waiting for selection of one or two or more answers, which are included in the questionnaire information displayed by the display unit, by operation input in the operation input unit, and causing a storage area to store the answers selected by the operation input in the operation input unit, the display unit displaying information in the fitting room and the operation input unit receiving operation input of information in the fitting room; and
the control unit adding, by storing in the storage area of the answer selected by the operation input in the operation input units, a set point to points stored by a point management file that stores customer IDs and points in association with each other, the points being stored by the point management file in association with a customer ID same as a customer ID output by a reader, the reader reading data from a medium, which stores data of a customer ID for identifying a customer, and outputting the data.

14. The method according to claim 13, wherein
the questionnaire information file stores data of the questionnaire information concerning the commodity identified by the commodity ID in association with the commodity ID, and
the control unit acquires, in acquiring the data of the questionnaire information from the questionnaire information file according to the acquisition of the data of the commodity ID, data of the questionnaire information corresponding to the acquired commodity ID from the questionnaire information file.

15. The method according to claim 13, wherein
the questionnaire information file stores data of the questionnaire information concerning a type of the customer in association with the type, and
the control unit acquires, in acquiring the data of the questionnaire information from the questionnaire information file according to the acquisition of the data of the commodity ID, data of the questionnaire information corresponding to the type of the customer identified by the customer ID, which is output by the reader, from the questionnaire information file.

16. The method according to claim 14, wherein
the questionnaire information file stores data of the questionnaire information concerning a type of the customer in association with the type, and
the control unit acquires, in acquiring the data of the questionnaire information from the questionnaire information file according to the acquisition of the data of the commodity ID, data of the questionnaire information corresponding to the type of the customer identified by the customer ID, which is output by the reader, from the questionnaire information file.

* * * * *